United States Patent
Kunert et al.

(12) 
(10) Patent No.: US 6,204,212 B1
(45) Date of Patent: Mar. 20, 2001

(54) BOROSILICATE GLASS OF GREATER RESISTANCE TO CHEMICAL ATTACK AND APPLICATIONS THEREOF

(75) Inventors: Christian Kunert; Peter Brix, both of Mainz (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/397,245

(22) Filed: Sep. 16, 1999

(30) Foreign Application Priority Data

Sep. 18, 1998 (DE) .............................................. 198 42 942

(51) Int. Cl.⁷ .................................................... C03C 3/093
(52) U.S. Cl. .................................. 501/67; 501/15; 501/21
(58) Field of Search .................................. 501/15, 66, 67, 501/21

(56) References Cited

U.S. PATENT DOCUMENTS

| | | | |
|---|---|---|---|
| 5,459,110 | * 10/1995 | Brix | 501/67 |
| 5,599,753 | * 2/1997 | Watzke et al. | 501/66 |
| 5,610,108 | * 3/1997 | Watzke et al. | 501/59 |
| 5,736,476 | * 4/1998 | Watzke et al. | 501/67 |

FOREIGN PATENT DOCUMENTS

| | | |
|---|---|---|
| 37 22 130 A1 | 1/1989 | (DE) . |
| 42 30 607 C1 | 1/1994 | (DE) . |
| 301 821 A7 | 4/1994 | (DE) . |
| 195 38 743 | * 10/1995 | (DE) . |
| 44 30 710 C1 | 5/1996 | (DE) . |
| 195 36 708 C1 | 10/1996 | (DE) . |
| 0 765 847 A1 | 4/1997 | (EP) . |

* cited by examiner

*Primary Examiner*—Karl Group
(74) *Attorney, Agent, or Firm*—Michael J. Striker

(57) ABSTRACT

The zirconium-containing and lithium-containing borosilicate glasses have a higher resistance to chemical attack and have the following composition (in % by weight on an oxide basis): $SiO_2$, 71 to <73%; $B_2O_3$, 7 to 10%; $Al_2O_3$, 6 to 9%; $Li_2O$, 0.5 to 2%; $Na_2O$, 0 to 10%; $K_2O$, 0 to 10%; MgO, 0 to 2%; CaO, 0 to 3%; SrO, 0 to 3%; BaO, 0 to 3%; ZnO, 0 to 3%; $ZrO_2$, 0.8 to 3%; $CeO_2$, 0 to 1%, and a refining agent in an amount suitable for refining, as needed, with the proviso that a total amount of $Li_2O+Na_2O+K_2O$ is from 0.5 to 10.5%, and with the proviso that a total amount of $MgO+CaO+SrO+BaO+ZnO$ is from 0 to 3%. These borosilicate glasses with their thermal expansion coefficients $\alpha_{20/300}$ between 5.2 and $5.7 \times 10^{-6}$/K are especially suitable for sealing glasses for Fe—Co—Ni alloys.

16 Claims, 1 Drawing Sheet

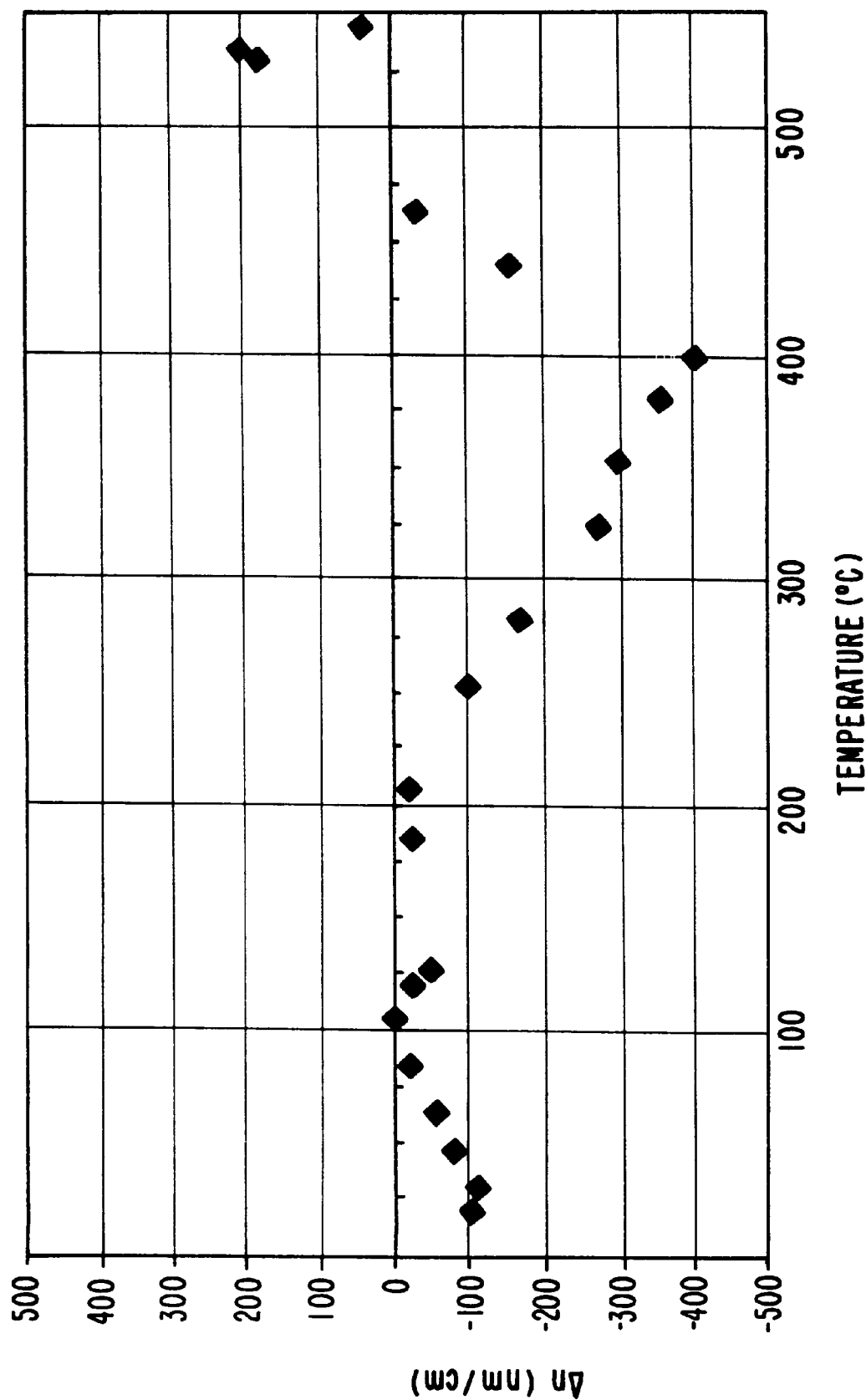

BOROSILICATE GLASS OF GREATER RESISTANCE TO CHEMICAL ATTACK AND APPLICATIONS THEREOF

BACKGROUND OF THE INVENTION

1. Field of the Invention

The present invention relates to a zirconium oxide and lithium oxide-containing borosilicate glass of increased resistance to attack by various chemical compounds and to the use of this improved borosilicate glass in several different applications.

2. Prior Art

Glasses, which have a very high resistance to chemical attack by both acidic and alkaline media, are required for glass-metal seals, which are exposed to a chemically corrosive environment, e.g. in chemical plants or reactor engineering. The thermal expansion properties of these sealing glasses must match those of high resistance metals or alloys that are employed. It is desirable that their linear expansion coefficients be close to or slightly under that of the metals to be sealed so that compressive strains build up in the glass on cooling of the seal. These compressive strains guarantee, on the one hand, a hermetic seal and, on the other hand, prevent the build up of tensile stresses in the glass, which would otherwise cause stress-corrosion. Glasses with thermal expansion coefficients $\alpha_{20/300}$ between 5.2 and $5.7 \times 10^{-6}$/K are required as sealing glasses for glass-metal seals with Fe—Ni—Co alloys, e.g. Vacon® 11, which has a thermal expansion coefficient $\alpha_{20/300}=5.4 \times 10^{-6}$/K, zirconium ($\alpha_{20/300}=5.9 \times 10^{-6}$/K) or zirconium alloys.

The processing temperature $V_A$ at which the viscosity of the glass is $10^4$ dPas is an essential parameter for characterizing the workability of a glass. It should be reduced since slight $V_A$ reductions have already led to a significant reduction in manufacturing costs, because the melting temperature is lowered. Furthermore a processing temperature $V_A$ which is as low as possible is of advantage in making glass-metal seals, since overheating of the parts to be sealed can be avoided, because they are already sealed either at a lower temperature or in a shorter time. Use of glasses with reduced or lowered processing temperatures $V_A$ can avoid volatilization and retrograde condensation of glass ingredients which can cause impairment of the sealing process and, in the worst case, unsealing. Furthermore the processing interval, i.e. the temperature difference of the processing temperature $V_A$ and the softening temperature $E_w$, i.e. the temperature at which the viscosity of the glass amounts to $10^{7.6}$ dPas, is important. The temperature range in which the glass can be processed is also designated as the "length" or "size" of the glass.

Glasses have already been described in the chemical literature which have a high resistance to chemical attack. However these glasses do not have the desired thermal expansion coefficients with simultaneously lower processing temperatures accompanying the high resistance to chemical attack.

German Patent DE 42 30 607 C1 discloses borosilicate glasses which have a high resistance to chemical attack and which can be sealed with tungsten. They have a thermal expansion coefficient $\alpha_{20/300}$ of at most=$4.5 \times 10^{-6}$/K.

The borosilicate glasses described in the published patent application DE 37 22 130 A1 and the zirconium-containing borosilicate glasses described in the German Patent DD 301 821 A7 have thermal expansion coefficients of at most 5.0 or $5.2 \times 10^{-6}$/K which is too low for sealing with the above-mentioned high resistance metal.

The glasses of German Patent DE 44 30 710 C1 have a high proportion of $SiO_2$, namely >75% by weight and >83% by weight $SiO_2$ and $B_2O_3$ in combination with a weight ratio of $SiO_2/B_2O_3>8$, and little $Al_2O_3$, which provides a high resistance to chemical attack but leads to a processing temperature which is disadvantageously too high.

The glasses of German Patent DE 195 35 708 C1 are highly resistant to chemical attack because of their high $SiO_2$ content, but have a disadvantageously high processing temperature and low thermal expansion. Also its resistance to attack by alkaline media drops with a decreasing $SiO_2/B_2O_3$ ratio, also with decreasing $SiO_2$ content.

SUMMARY OF THE INVENTION

It is an object of the present invention to provide a glass which fulfills the above-described requirements for both resistance to chemical attack, processing temperature and thermal expansion coefficient, and which makes a sufficiently tight seal with the above-mentioned metals and alloys possible.

This object is attained according to the invention by a zirconium-containing and lithium-containing borosilicate glass of a high resistance to chemical attack having the following composition(in % by weight on an oxide basis):

| | |
|---|---|
| $SiO_2$ | 71 to <73% |
| $B_2O_3$ | 7 to 10% |
| $Al_2O_3$ | 5.5 to 9% |
| $Li_2O$ | 0.5 to 2% |
| $Na_2O$ | 0 to 10% |
| $K_2O$ | 0 to 10% |
| MgO | 0 to 2% |
| CaO | 0 to 3% |
| SrO | 0 to 3% |
| BaO | 0 to 3% |
| ZnO | 0 to 3% |
| $ZrO_2$ | 0.8 to 3% |
| $CeO_2$ | 0 to 1%, | with the proviso that a total amount of $Li_2O+Na_2O+K_2O$ is from 0.5 to 10.5%, and with the proviso that a total amount of MgO+CaO+SrO+BaO+ZnO is from 0 to 3%.

The glass according to the invention differs from the known glasses having a high resistance to chemical attack because of a lower $SiO_2$ content of from 71 to <73% by weight, preferably only up to 72.5% by weight. It was indeed completely surprising that glasses with so little $SiO_2$ could have both a high acid resistance and also a high alkali resistance so that they belong to the respective first resistance categories. Previously it was believed that good resistance could not be obtained when the $SiO_2$ content is reduced. The comparatively low $SiO_2$ content advantageously provides the desired properties, namely the lower processing temperature and comparatively higher thermal expansion coefficient.

The glass according to the invention contains at least 5.5% by weight, preferably at least 6% by weight, especially preferably at least 6.5% by weight, and at most 9% by weight, preferably at most 8.5% by weight of $Al_2O_3$. The glass is very crystallization stable, because of this comparatively high content, which facilitates large-scale manufacture. With higher content however the melting temperature increases without further improvements in the crystallization resistance.

The glass contains from 7 to 10% by weight, preferably at least 7.5% by weight, $B_2O_3$ in order to lower the melting temperature with simultaneous improvement in the resistance to chemical attack. The melting temperature is not sufficiently lowered with smaller amounts of $B_2O_3$, while the acid resistance would decrease with larger amounts.

The simultaneous presence of $Li_2O$ (0.5 to 2 percent by weight, preferably up to 1.5% by weight, especially preferably 0.7 to 1.4% by weight) and $ZrO_2$ (at least 0.8% by weight, preferably at least 0.9% by weight, at most 3% by weight, preferably at most 2% by weight) contributes essentially to the outstanding resistance to chemical attack. Especially $ZrO_2$ improves the resistance to alkali or alkaline media. The $Li_2O$ content acts to oppose the increase in melting and processing temperatures called for by $ZrO_2$. Indeed the melting temperature would be lowered with an $Li_2O$ content above 2% by weight, but the hydrolytic resistance would decrease and the glass is made more expensive. Moreover there is an increased danger of glass faults or imperfections at high $ZrO_2$ content, since particles of difficult-to-dissolve $ZrO_2$ raw material remain unmelted and are present in the product.

The other alkali oxides $Na_2O$ and $K_2O$ can be present in up to 10% by weight amounts and serve to lower the melting and processing temperature. Thus the entire alkali content ($Li_2O+Na_2O+K_2O$) should not exceed 10.5% by weight, especially since the hydrolytic resistance would decrease. Preferably the content of the continuously facultative ingredient $K_2O$ is limited to 6% by weight, especially preferably to 4% by weight. $Na_2O$ is present, preferably from 3 to 7.5% by weight, especially preferably from 3.5 to 7.2% by weight. The sum total of the three alkali oxides is preferably 3.5 to 10.5% by weight, and especially preferably from 7 to 9.5% by weight.

The glass according to the invention can contain the divalent oxides, MgO, in an amount equal to from 0 to 2% by weight, preferably 0 to 1% by weight; CaO, in an amount equal to from 0 to 3% by weight, preferably from 0 to 2 percent by weight; SrO, in an amount equal to from 0 to 3% by weight; BaO in an amount equal to from 0 to 3% by weight, and ZnO, in an amount equal to from 0 to 3% by weight, preferably from 0 to 1% by weight. These ingredients vary the "length or size of the glass", thus the temperature range in which the glass is workable. The viscosity behavior can be adjusted to the requirements of the respective manufacturing and processing methods by the exchange of these oxides with each other because of the strongly different network-modifying action of these ingredients. Particularly acid resistance is increased by CaO and ZnO. The sum of the alkaline earth oxides and ZnO should amount to between 0 and 3% by weight, since the tendency for devitrification can occur with larger amounts of these ingredients. In preferred embodiments the glass is SrO-free, BaO-free and ZnO-free and contains from 0.5 to 2% by weight CaO with 0 to 1% by weight MgO. The sum of the CaO and MgO amounts to from 0.5 to 2% by weight.

The glass can also contain color-imparting ingredients, preferably $Fe_2O_3$, $Cr_2O_3$ and CoO, in amounts of up to 1% by weight respectively. Also however the sum of all ingredients of this type should not exceed 1% by weight. The glass can contain up to 3% by weight $TiO_2$. This latter ingredient is preferably used when damage of the glass-metal seal by UV radiation or the release of UV radiation should be prevented in special fields.

The glass can contain up to 1% by weight $CeO_2$. At low concentrations $CeO_2$ acts as a refining agent, while at higher concentrations it prevents the discoloration of the glass by radiation from radioactive substances. Seals thus formed with this type of $CeO_2$-containing glass can still be observed visually for damage, such as cracks or corrosion of conducting wires after being exposed to radioactivity. However the glass is made more expensive by still higher $CeO_2$ concentrations. These higher amounts of $CeO_2$ lead to an undesirable yellow-brown color. For uses in which it is not essential to avoid discoloration due to radioactive radiation, a $CeO_2$ content between 0 and 0.3% by weight is preferable.

The glass can be refined or purified with the standard refining agents, such as $As_2O_3$, $Sb_2O_3$, the already-mentioned $CeO_2$, NaCl, $CaF_2$ or NaF, which are employed in the standard amounts, i.e. according to the amount and type of refining agent in amounts of from 0.05 to 1% by weight, in the finished glass.

BRIEF DESCRIPTION OF THE DRAWING

The sole FIGURE is a graphical illustration of the dependence of the strain in a glass-metal seal between a high resistance borosilicate glass according to the example 6 of Table I below and a Ni—Co—Fe alloy, namely Vacon® 11.

EXAMPLES

Eight examples of the glasses according to the invention were prepared by melting the raw materials together.

The glasses were made according to the following method: The raw or starting materials were weighed out and mixed. The glass samples were melted at about 1620° C. and subsequently poured into steel molds.

Table I lists the respective compositions (in % by weight on the basis of the oxide), the thermal expansion coefficient $\alpha_{20/300}$ [$10^{-6}$/K], transformation temperature $T_g$[° C.], softening temperature $E_w$, processing temperature $V_A$ [° C.], density [g/cm$^3$] and hydrolytic, acid and alkali resistance of the eight glasses according to the invention.

The chemical resistances were determined in the following manner:

The hydrolytic resistance H was determined according to DIN ISO 719. It was given in basic equivalents of the acid consumption as $\mu$g $Na_2O$/g glass grit. The maximum value for a chemically resistant glass of hydrolytic class 1 is 31 $\mu$g $Na_2O$/g.

The acid resistance S was determined according to DIN ISO 12116. It was given as the weight loss in mg/dm$^2$. The maximum amount removed from an acid-resistant glass of acid class 1 is 0.70 mg/dm$^2$.

The alkali resistance L was determined according to DIN ISO 695. It was given as the weight loss in mg/dm$^2$. The maximum amount removed from a glass of alkali class 1 (weakly alkali soluble) amounts to 75 mg/dm$^2$.

The requirements of the respective class 1 resistances are fulfilled by the glasses according to the invention. They have outstanding chemical resistances with H=1, S=1 and L=1.

Their lowered processing or working temperature $V_A$ of at most 1175° C. characterizes their satisfactory workability.

The glasses according to the invention are outstandingly suitable for all application purposes, in which glasses having a high resistance to chemical attack are required, e.g. for laboratory applications, for chemical plants, especially as tubing, and for containers for medical purposes, for primary pharmaceutical packing materials, such ampoules or small bottles. These glasses are also very good as jacket glass for glass fibers.

The glasses according to the invention have thermal expansion coefficients $\alpha_{20/300}$ between 5.2 and 5.7x$10^{-6}$/K. Their linear expansion behavior is satisfactorily matched to the alloys of Fe, Co and Ni, e.g. Vacon® 11 ($\alpha_{20/300}$=5.4x $10^{-6}$/K) and to zirconium ($\alpha_{20/300}$=5.9x$10^{-6}$/K). These glasses are suitable for glass-metal sealing with these metals or alloys of high chemical resistance. Because of their own high resistance to chemical attack they are especially suitable for glass-metal seals, which are used in corrosive chemical environments, e.g. in chemical plants or reactor structures, or also as compression glasses, glasses for viewing windows in steel high pressure vessels or reactors in which reactive chemical substances are contained under pressure.

For illustration of the good matching between the glasses and contact materials, i.e. materials, such as metals, which are used for electrical contacts or terminals and conductors in glass-metal conduits and seals, the FIGURE shows the dependence of the strain in a seal between the glass Nr. 6 in Table I and Vacon® 11, an alloy containing 29% Ni, 18% Co, with a balance of Fe, on temperature. To characterize the strain in a seal the strain birefringence of the glass is used, also the fact that glass under strain or load changes its refraction properties. The measured parameter, given in nm/cm, is the path difference, which occurs between a polarized light ray, which travels through a sample to be tested and a refracted ray. Negative numerical values mean compressive strain. In the seals of this type compressive strain is desirable in the glass but little or no tensile strain is desirable. This condition is fulfilled in the illustrated seals up to about 450° C. Thus no injurious tensile stresses, which could lead to damage of the seals, occur in the glasses in use of the seals up to 450° C.

without omitting features that, from the standpoint of prior art, fairly constitute essential characteristics of the generic or specific aspects of this invention.

What is claimed is new and is set forth in the following appended claims.

We claim:

1. A zirconium-containing and lithium-containing borosilicate glass having a resistance to chemical attack and comprising, in % by weight on an oxide basis:

| | |
|---|---|
| $SiO_2$ | 71 to <73% |
| $B_2O_3$ | 7 to 10% |
| $Al_2O_3$ | 5.5 to 9% |
| $Li_2O$ | 0.5 to 2% |
| $Na_2O$ | 0 to 10% |
| $K_2O$ | 0 to 10% |
| MgO | 0 to 2% |
| CaO | 0 to 3% |
| SrO | 0 to 3% |
| BaO | 0 to 3% |
| ZnO | 0 to 3% |
| $ZrO_2$ | 0.8 to 3% |
| $CeO_2$ | 0 to 1%, and | a refining agent in an amount suitable for refining, as needed, with the proviso that a total amount of said $Li_2O$ and said $Na_2O$ and said $K_2O$ is from 0.5 to 10.5%, and with the

TABLE I

PROPERTIES AND COMPOSITIONS (IN % BY WEIGHT ON AN OXIDE BASIS) OF THE GLASSES OF THE INVENTION

| | 1 | 2 | 3 | 4 | 5 | 6 | 7 | 8 |
|---|---|---|---|---|---|---|---|---|
| $SiO_2$ | 71.00 | 71.00 | 71.00 | 71.24 | 71.75 | 71.75 | 72.50 | 72.50 |
| $B_2O_3$ | 9.80 | 9.12 | 10.00 | 8.62 | 9.45 | 8.90 | 7.50 | 8.65 |
| $Al_2O_3$ | 7.36 | 6.19 | 6.37 | 8.50 | 7.50 | 7.00 | 8.20 | 7.50 |
| $Li_2O$ | 1.20 | 1.20 | 1.00 | 1.00 | 0.70 | 1.30 | 1.40 | 1.20 |
| $Na_2O$ | 4.44 | 3.92 | 4.60 | 7.16 | 6.05 | 5.45 | 6.84 | 5.78 |
| $K_2O$ | 2.50 | 4.00 | 3.50 | — | 1.60 | 1.60 | 0.36 | 1.88 |
| MgO | — | 1.00 | — | — | — | — | — | — |
| CaO | 1.80 | 1.58 | 1.80 | 1.48 | 1.80 | 1.80 | 1.19 | 0.50 |
| $ZrO_2$ | 1.91 | 2.00 | 1.73 | 2.00 | 0.95 | 2.00 | 2.00 | 2.00 |
| $CeO_2$ | — | — | — | 0.20 | 0.20 | — | — | — |
| $\alpha_{20/300}$* | 5.22 | 5.51 | 5.50 | 5.50 | 5.44 | 5.42 | 5.60 | 5.41 |
| $T_g$, ° C. | 544 | 543 | 549 | 547 | 551 | 540 | 538 | 543 |
| $E_w$, ° C. | 771 | 771 | 767 | 766 | 787 | 765 | 761 | 771 |
| $V_A$, ° C. | 1166 | 1168 | 1156 | 1155 | 1167 | 1144 | 1151 | 1170 |
| ρ, g/cm³ | 2.37 | 2.30 | 2.38 | 2.39 | 2.37 | 2.38 | 2.39 | 2.38 |
| H,*' | 10 | 13 | 10 | 12 | 12 | 10 | 12 | 8 |
| S, mg/dm² | 0.63 | 0.61 | 0.55 | 0.60 | 0.60 | 0.60 | 0.47 | 0.62 |
| L, mg/dm² | 65 | 55 | 65 | 55 | 71 | 62 | 49 | 54 |

*$\alpha_{20/300}$ is in units of $10^{-6}$/K, *'H is in units of µg $Na_2O$/g

The disclosure in German Patent Application 198 42 942.8-45 of Sep. 18, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in borosilicate glasses with a high resistance to chemical attack and uses thereof, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications proviso that a total amount of said MgO and said CaO and said SrO and said BaO and said ZnO is from 0 to 3%.

2. The borosilicate glass as defined in claim 1, further comprising from 0 to 3% by weight, on said oxide basis, of $TiO_2$ and from 0 to 1% by weight, on said oxide basis, of a total amount of $Fe_2O_3$ and $Cr_2O_3$ and CoO.

3. The borosilicate glass as defined in claim 1, having a thermal expansion coefficient $\alpha_{20/300}$ between 5.2 and 5.7× $10^{-6}$/K and a processing temperature $V_A$ of at most 1175° C.

4. A zirconium-containing and lithium-containing borosilicate glass having a resistance to chemical attack and comprising, in % by weight on an oxide basis:

| | |
|---|---|
| $SiO_2$ | 71 to <73% |
| $B_2O_3$ | 7 to 10% |
| $Al_2O_3$ | 6 to 8% |
| $Li_2O$ | 0.5 to 1.5% |
| $Na_2O$ | 3 to 7.5% |
| $K_2O$ | 0 to 6% |
| MgO | 0 to 2% |
| CaO | 0 to 2% |
| SrO | 0 to 3% |
| BaO | 0 to 3% |
| ZnO | 0 to 3% |
| $ZrO_2$ | 0.9 to 2% |
| $CeO_2$ | 0 to 1%, and | a refining agent in an amount suitable for refining, as needed, with the proviso that a total amount of said $Li_2O$ and said $Na_2O$ and said $K_2O$ is from 3.5 to 10.5%, and with the proviso that a total amount of said MgO and said CaO and said SrO and said BaO and said ZnO is from 0 to 3%.

5. The borosilicate glass as defined in claim 4, further comprising from 0 to 3% by weight, on said oxide basis, of $TiO_2$ and from 0 to 1% by weight, on said oxide basis, of a total amount of $Fe_2O_3$ and $Cr_2O_3$ and CoO.

6. The borosilicate glass as defined in claim 4, having a thermal expansion coefficient $\alpha_{20/300}$ between 5.2 and 5.7× $10^{-6}$/K and a processing temperature $V_A$ of at most 1175° C.

7. A zirconium-containing and lithium-containing borosilicate glass having a resistance to chemical attack and comprising, in % by weight on an oxide basis:

| | |
|---|---|
| $SiO_2$ | 71 to 72.5% |
| $B_2O_3$ | 7.5 to 10% |
| $Al_2O_3$ | 6 to 8.5% |
| $Li_2O$ | 0.5 to 1.5% |
| $Na_2O$ | 3 to 7.5% |
| $K_2O$ | 0 to 4% |
| MgO | 0 to 2% |
| CaO | 0 to 3% |
| SrO | 0 to 3% |
| BaO | 0 to 3% |
| ZnO | 0 to 1% |
| $ZrO_2$ | 0.9 to 2% |
| $CeO_2$ | 0 to 1%, and | a refining agent in an amount suitable for refining, as needed, with the proviso that a total amount of said $Li_2O$ and said $Na_2O$ and said $K_2O$ is from 3.5 to 10.5%, and with the proviso that a total amount of said MgO and said CaO and said SrO and said BaO and said ZnO is from 0 to 3%.

8. The borosilicate glass as defined in claim 7, further comprising from 0 to 3% by weight, on said oxide basis, of $TiO_2$ and from 0 to 1% by weight, on said oxide basis, of a total amount of $Fe_2O_3$ and $Cr_2O_3$ and CoO.

9. The borosilicate glass as defined in claim 7, having a thermal expansion coefficient $\alpha_{20/300}$ between 5.2 and 5.7× $10^{-6}$/K and a processing temperature $V_A$ of at most 1175° C.

10. A zirconium-containing and lithium-containing borosilicate glass having a resistance to chemical attack and comprising, in % by weight on an oxide basis:

| | |
|---|---|
| $SiO_2$ | 71 to 72.5% |
| $B_2O_3$ | 7.5 to 10% |
| $Al_2O_3$ | 6.5 to 8.5% |
| $Li_2O$ | 0.7 to 1.4% |
| $Na_2O$ | 3.5 to 7.2% |
| $K_2O$ | 0 to 4% |
| MgO | 0 to 1% |
| CaO | 0.5 to 2% |
| $ZrO_2$ | 0.9 to 2% |
| $CeO_2$ | 0 to 0.3%, and | a refining agent in an amount suitable for refining, as needed, with the proviso that a total amount of said $Li_2O$ and said $Na_2O$ and said $K_2O$ is from 7 to 9.5%, and with the proviso that a total amount of said MgO and said CaO is from 0.5 to 2%.

11. The borosilicate glass as defined in claim 10, further comprising from 0 to 3% by weight, on said oxide basis, of $TiO_2$ and from 0 to 1% by weight, on said oxide basis, of a total amount of $Fe_2O_3$ and $Cr_2O_3$ and CoO.

12. The borosilicate glass as defined in claim 10, having a thermal expansion coefficient $\alpha_{20/300}$ between 5.2 and $5.7 \times 10^{-6}$/K and a processing temperature $V_A$ of at most 1175° C.

13. A sealing glass for Fe—Co—Ni alloys comprising a borosilicate glass according to claim 1, 4, 7 or 10.

14. An equipment glass for laboratory use comprising a borosilicate glass according to claim 1, 4, 7 or 10.

15. A primary pharmaceutical packaging material comprising a borosilicate glass according to claim 1, 4, 7 or 10.

16. An ampoule glass comprising a borosilicate glass according to claim 1, 4, 7 or 10.

* * * * *